US012277691B2

United States Patent
Lee

(10) Patent No.: US 12,277,691 B2
(45) Date of Patent: Apr. 15, 2025

(54) METHOD AND SYSTEM FOR OUTPUTTING A SLICE CORRESPONDING TO A TARGET ITEM FOR 3D IMAGE INCLUDING A PLURALITY OF SLICES

(71) Applicant: LUNIT INC., Seoul (KR)

(72) Inventor: Hyunjae Lee, Seoul (KR)

(73) Assignee: LUNIT INC., Seoul (KR)

( * ) Notice: Subject to any disclaimer, the term of this patent is extended or adjusted under 35 U.S.C. 154(b) by 432 days.

(21) Appl. No.: 17/363,793

(22) Filed: Jun. 30, 2021

(65) Prior Publication Data
US 2021/0390679 A1    Dec. 16, 2021

(30) Foreign Application Priority Data

May 12, 2020 (KR) .................. 10-2020-0056597
Jan. 19, 2021 (KR) .................. 10-2021-0007637

(51) Int. Cl.
*G06T 7/00* (2017.01)

(52) U.S. Cl.
CPC ............ *G06T 7/0002* (2013.01); *G06T 2207/10012* (2013.01); *G06T 2207/10072* (2013.01)

(58) Field of Classification Search
None
See application file for complete search history.

(56) References Cited

U.S. PATENT DOCUMENTS

| 10,580,131 B2* | 3/2020 | Mazo .................. G06T 7/11 |
| 11,263,749 B1* | 3/2022 | Purushottam .......... G16H 15/00 |
| 11,551,353 B2* | 1/2023 | Golden .................. G06N 3/08 |
| 11,776,215 B1* | 10/2023 | Cheng ................ G06F 3/04847 345/419 |

OTHER PUBLICATIONS

Zheng H, Zhang Y, Yang L, Wang C, Chen DZ. An Annotation Sparsification Strategy for 3D Medical Image Segmentation via Representative Selection and Self-Training. Proc AAAI Conf Artif Intell. Feb. 2020;34(44):6925-6932. doi: 10.1609/aaai.v34i04.6175. Epub Apr. 3, 2020. PMID: 33274122; PMCID: PMC7710151. (Year: 2020).*

Liao, et al., "Iteratively-Refined Interactive 3D Medical Image Segmentation with Multi-Agent Reinforcement Learning", CVPR, 2020, pp. 9394-9402 (9 pages).

Zheng, et al., "An Annotation Sparsification Strategy for 3D Medical Image Segmentation via Representative Selection and Self-Training", Association for the Advancement of Artificial Intelligence, 2020, pp. 6925-6932 (8 pages).

Mlynarski, et al., "3D Convolutional Neural Networks for Tumor Segmentation using Long-range 2D Context", arXiv:1807.08599v1 [cs.CV], Jul. 23, 2018 (32 pages).

* cited by examiner

*Primary Examiner* — Tahmina N Ansari
(74) *Attorney, Agent, or Firm* — Sughrue Mion, PLLC

(57) ABSTRACT

Provided is a method for providing annotation information for a 3D image, which may include outputting a representative image for the 3D image including a plurality of slices, selecting at least one pixel associated with a target item from among a plurality of pixels included in the representative image, outputting, among the plurality of slices, a slice associated with the selected at least one pixel, and receiving an annotation for a partial region of the output slice.

18 Claims, 10 Drawing Sheets

METHOD AND SYSTEM FOR OUTPUTTING A SLICE CORRESPONDING TO A TARGET ITEM FOR 3D IMAGE INCLUDING A PLURALITY OF SLICES

CROSS-REFERENCE TO RELATED APPLICATIONS

This application claims priority under 35 U.S.C § 119 to Korean Patent Applications Nos. 10-2021-0007637 and 10-2020-0056597, filed in the Korean Intellectual Property Office on Jan. 19, 2021 and May 12, 2020, respectively, the entire contents of which are hereby incorporated by reference.

TECHNICAL FIELD

The present disclosure relates to a method and system for providing annotation information for a 3D image, and more specifically, to providing a method and system for providing, when a portion in a representative image corresponding to a 3D image is selected, at least one slice that corresponds to the selected portion among a plurality of slices included in the 3D image, as an image to be annotated.

BACKGROUND ART

In recent years, as hardware such as processors, memories, and cameras are fast developed, artificial intelligence (AI) technology has been developed and is receiving increasing attention. For example, researches on applying these AI technologies to the field of image processing is being actively conducted. Supervised learning is a machine learning method for constructing an artificial neural network model for performing inference on input data by learning a dataset tagged with label information (that is, correct answer information). The annotation work for tagging the label information to generate a training data set is usually performed by humans, and most of the annotation work is cost- and time-consuming work.

In particular, in the case of performing the annotation work for a 3D video formed of a plurality of slices according to a related art, there is a need for an annotator to directly determine an image to be annotated from among a plurality of slices, and then perform an annotation work for the determined image. As such, since the annotator needs to check all of the plurality of slices and determine which slice image best represents the lesion, whether the lesion is visible in a specific slice image, and so on, a considerable time is required to perform the annotation work for the 3D image.

SUMMARY

In order to solve the problems described above, the present disclosure provides a method and system for providing annotation information for a 3D image.

The present disclosure may be implemented in a variety of ways, including a method, an apparatus, a system (e.g., a server system, a cloud system, etc.), or a computer-readable storage medium storing instructions, or a computer program.

According to an embodiment of the present disclosure, a method, performed by one or more computing devices, for providing annotation information for a 3D image is provided, may include outputting a representative image for the 3D image including a plurality of slices, selecting at least one pixel associated with a target item from among a plurality of pixels included in the representative image, outputting, among the plurality of slices, a slice that is associated with the selected at least one pixel, and receiving an annotation for a partial region of the output slice.

According to an embodiment of the present disclosure, a prediction score for the target item is output by inputting each of the plurality of slices to a target item detection model, the prediction score for the target item may include a plurality of prediction scores for a plurality of pixels included in each of the plurality of slices, and the target item detection model may be trained to output the prediction score for the target item for each of the plurality of pixels included in a 2D image.

According to an embodiment of the present disclosure, the outputting, among the plurality of slices, the slice that is associated with the selected at least one pixel may include outputting, among the plurality of slices, a slice that has a highest prediction score for the target item in the at least one pixel.

According to an embodiment of the present disclosure, the outputting, among the plurality of slices, the slice associated with the selected at least one pixel may include outputting one or more slices that have prediction scores for the target item in the selected at least one pixel equal to or greater than a predetermined threshold.

According to an embodiment of the present disclosure, the plurality of slices may include information on a sequence of the plurality of slices, the one or more slices that have the prediction scores equal to or greater than the predetermined threshold may include a plurality of slices that have prediction scores equal to or greater than the predetermined threshold, and the outputting, among the plurality of slices, a slice associated with the selected at least one pixel may include outputting at least one of a first slice or a last slice in the plurality of slices that have the prediction scores equal to or greater than the predetermined threshold.

According to an embodiment of the present disclosure, the target item detection model may be updated based on the slice that is associated with the at least one pixel, and the received annotation.

According to an embodiment of the present disclosure, the method may further include applying the received annotation for the partial region to a slice that includes the target item and is different from the slice associated with the at least one pixel, wherein the target item detection model may be updated based on the slice that is different from the slice associated with the at least one pixel and the received annotation.

According to an embodiment of the present disclosure, the representative image may be generated based on the prediction score for the target item.

According to an embodiment of the present disclosure, the representative image may be associated with final prediction score information for pixels that have a highest prediction score of the plurality of prediction scores for the target item corresponding to the plurality of pixels included in each of the plurality of slices, and with backtracking information on one or more slices associated with the pixels that have the highest prediction score, and the outputting, among the plurality of slices, the slice that is associated with the selected at least one pixel may include extracting a slice from one or more slices included in the backtracking information, wherein the extracted slice is associated with the selected at least one pixel, and outputting the extracted slice.

According to an embodiment of the present disclosure, the outputting the slice associated with the selected at least one pixel may include applying a prediction result generated based on the prediction score for the target item to the slice associated with the at least one pixel, and outputting the applied slice.

According to an embodiment of the present disclosure, the target item detection model may be trained to further infer additional information on the target item included in the 3D image, and the outputting the representative image for the 3D image including the plurality of slices may include outputting the additional information associated with the representative image.

A computer program stored in a computer-readable recording medium may be provided, for executing, on a computer, the method for providing annotation information for a 3D image described above according to an embodiment.

A user terminal according to an embodiment may include a memory storing one or more instructions, and a processor configured to execute the stored one or more instructions to: output a representative image for a 3D image including a plurality of slices; select at least one pixel associated with a target item from among a plurality of pixels included in the representative image; output, among the plurality of slices, a slice associated with the at least one pixel; and receive an annotation for a partial region of the output slice.

According to an embodiment of the present disclosure, an annotator can be provided with an image to perform an annotation work as he or she selects a partial region of the representative image. Accordingly, it may not be necessary for the annotator to manually find an image to be annotated by individually checking a plurality of 2D images included in the 3D image, and the amount of work of the annotator can be reduced and the efficiency of the annotation work can be improved.

According to an embodiment of the present disclosure, annotation time of an annotator can be reduced by automatically finding a slice showing a lesion (e.g., a cancer lesion) based on a prediction result of a trained network from a 3D image and providing it to the annotator.

According to an embodiment of the present disclosure, by displaying the prediction result of the trained network together with the slice, it is possible to assist the annotator with annotation work.

The effects of the present disclosure are not limited to the effects described above, and other effects not described will be able to be clearly understood by those of ordinary skill in the art (hereinafter, referred to as "ordinary technician") from the description of the claims.

BRIEF DESCRIPTION OF THE DRAWINGS

Embodiments of the present disclosure will be described with reference to the accompanying drawings described below, in which like reference numerals denote like elements, but are not limited thereto.

DETAILED DESCRIPTION OF THE INVENTION

Figure 1:
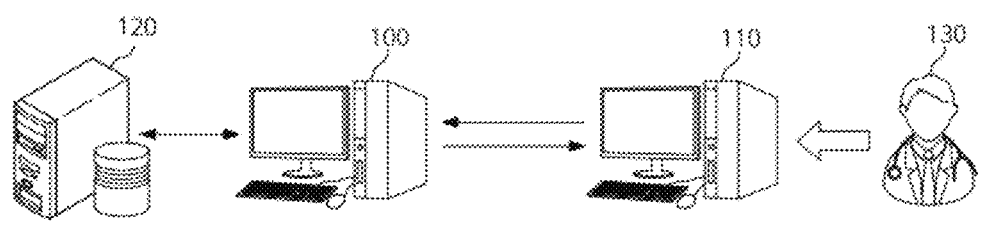
FIG. 1 is an exemplary configuration diagram illustrating a system for providing annotation information for a 3D image according to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of elements are omitted, it is not intended that such elements are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms.

Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units," or further divided into additional components and "modules" or "units."

According to an embodiment of the present disclosure, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with a processor is in electronic communication with the processor.

In the present disclosure, the "system" may refer to at least one of a server device and a cloud device, but not limited thereto. For example, the system may include one or more server devices. As another example, the system may include one or more cloud devices. As another example, the system may be configured together with both a server device and a cloud device and operated.

In the present disclosure, a "3D image" and/or a "slice" may refer to any image data or image data item that can be used for training and/or inference of a machine learning model. According to an embodiment, the "slice" may refer to one of a plurality of images included in a 3D video of a 3D object, and may refer to a digital image photographed based on a specific depth, for example. The "3D image" and/or the "slice" may herein include information on cells, tissues, lesions, and/or structures in a human body. For example, the "3D image" may include Digital Breast Tomosynthesis images and the like, and "a plurality of slices" may include a plurality of images forming a corresponding 3D image, and the like. In the present disclosure, "a plurality of slices" may refer to at least some or all of the slices forming the "3D image."

In the present disclosure, a "display device" may refer to any display device associated with a computing device, and for example, it may refer to any display device that is controlled by the computing device, or that can output or display any information/data provided from the computing device.

In the present disclosure, "output" or "outputting" may refer to outputting one or more slices and/or images by a computing device (e.g., a user terminal, etc.). In one embodiment, outputting the slices and/or images by the user terminal may indicate that the user terminal outputs or displays the slices and/or images through a display device associated with the user terminal. In this case, the user terminal may include any processer (e.g., CPU (Central Processing Unit) and/or GPU (Graphic Processing Unit)) configured to output or display the slices and/or images through the display device.

In the present disclosure, a "target item" may refer to data/information, an image region, an object, and the like in the 3D image and/or slice, for which the annotator intends to provide label information. For example, the "target item" may include a cancer lesion.

In the present disclosure, a "pixel" may refer to a pixel included in the slice and/or the representative image. For example, the pixel may refer to one pixel. As another example, the pixel may refer to a plurality of pixels, that is, to one pixel group. In the present disclosure, the "at least one pixel" may refer to a pixel selected by the annotator and/or a median value (that is, a center pixel) of the selected pixels. Alternatively, the "at least one pixel" may refer to some of the pixels selected by the annotator.

In the present disclosure, an "artificial neural network model" is an example of a machine learning model, and may include any model used to infer an answer to a given input. According to an embodiment, the artificial neural network model may include an artificial neural network model including an input layer, a plurality of hidden layers, and an output layer. In an example, each layer may include one or more nodes. For example, the artificial neural network model may be trained to calculate a prediction score for the target item for a plurality of pixels included in the slice. In addition, the artificial neural network model may include weights associated with a plurality of nodes included in the artificial neural network model. In an example, the weights may include any parameter that is associated with the artificial neural network model.

In the present disclosure, "each of a plurality of A" may refer to each of all components included in the plurality of A, or may refer to each of some of the components included in a plurality of A. For example, each of the plurality of slices may refer to each of all slices included in the plurality of slices or may refer to each of some slices included in the plurality of slices. In the present disclosure, "a plurality of pixels included in each of a plurality of slices" may mean that each of the slices includes a plurality of pixels.

In the present disclosure, the "prediction score for target item" may refer to a value obtained by quantifying the probability that the target item will be present in the corresponding region, the presence or absence of the same, and the like. The "prediction score" may be calculated for each of a plurality of slices. Alternatively, the "prediction score"

may be calculated for each of a plurality of pixels included in the slice. For example, the "prediction score" may refer to a "prediction result." Conversely, the "prediction result" may refer to the "prediction score" itself. Alternatively or additionally, the "prediction result" may refer to data/information generated based on the "prediction score." For example, the "prediction result" may include a heatmap, contour data, and the like generated based on the prediction score.

In the present disclosure, the "final prediction result" may refer to a result generated by fusing the prediction results for each of a plurality of slices. For example, the "final prediction result" may refer to final prediction score and/or final prediction score information. Conversely, the "final prediction score" and/or the "final prediction score information" may refer to the final prediction result. According to an embodiment, for a specific pixel, the "final prediction result" and/or the "final prediction score information" may be generated by determining the final prediction score of the pixel based on the highest prediction score among the prediction scores for the target item in each of a plurality of slices. For example, the "final prediction result," the "final prediction score," and/or the "final prediction score information" may be generated by performing pixel-wise max based on the prediction results for a plurality of slices.

In the present disclosure, the "weight" may refer to a numerical value indicative of a degree of reflecting the inference result of each of the plurality of sub-images included in the target image when this is reflected to generate the inference result for the target image. For example, according to the weight applied to each of the plurality of sub-images in the target image, the influence that the inference result for each of the plurality of sub-images may have on the inference result for the target image, that is, on the final inference result, may be determined. This "weight" may be calculated and/or applied in units of pixels or in units of pixel groups including a plurality of pixels.

In the present disclosure, "instructions" may refer to one or more instructions grouped based on a function, which are the components of a computer program and those that are executed by the processor.

In the present disclosure, "user" may refer to a person who uses a user terminal, and may refer to an annotator, for example. In addition, the user may refer to the user terminal, or conversely, the user terminal may refer to the user. That is, the user and the user terminal may be interchangeably used herein.

In the present disclosure, the "annotation" may refer to an annotation work and/or annotation information (e.g., label information, and the like) determined by performing the annotation work. In the present disclosure, the "annotation information" may refer to information for the annotation work and/or information generated by the annotation work (e.g., label information).

FIG. 1 is an exemplary configuration diagram illustrating a system for providing annotation information for a 3D image according to an embodiment. As illustrated, an information processing system 100 may be configured to be connected to each of a user terminal 110 and a storage system 120 for communication. While FIG. 1 illustrates one user terminal 110, the present disclosure is not limited thereto, and in an exemplary configuration, a plurality of user terminals 110 may be connected to the information processing system 100 for communication. In addition, while the information processing system 100 is shown as one computing device in FIG. 1, but is not limited thereto, and the information processing system 100 may be configured to process information and/or data in a distributed manner through a plurality of computing devices. In addition, while the storage system 120 is shown as a single device in FIG. 1, but is not limited thereto, and the system may be configured with a plurality of storage devices or as a system that supports a cloud. In addition, respective components of the system for providing annotation information for a 3D image shown in FIG. 1 represent functional components that can be divided on the basis of functions, and in an actual physical environment, a plurality of components may be implemented as being incorporated with each other.

The information processing system 100 and the user terminal 110 may be any computing devices that are used for providing annotation information for a 3D image. In an example, the computing device may refer to any type of device equipped with a computing function, and may be a notebook, a desktop, a laptop, a tablet computer, a server, a cloud system, and the like, for example, but is not limited thereto.

The information processing system 100 may include a target item detection model (e.g., a machine learning model and the like) trained to output a prediction score for a target item for each of a plurality of pixels included in a 2D image. According to an embodiment, the information processing system 100 may output the prediction score for the target item by inputting each of a plurality of slices forming a 3D image into the target item detection model. In an example, the prediction score for the target item may include a plurality of prediction scores for a plurality of pixels included in each of the plurality of slices. The information processing system 100 may generate a representative image based on the prediction score for the target item, and provide the generated representative image to the user terminal 110. Alternatively or additionally, the information processing system 100 may provide data on the prediction score for the target item to the user terminal 110, and the user terminal 110 may generate a representative image based on the received data.

The user terminal 110 may receive a plurality of slices of the 3D image, the representative image and/or annotation information (e.g., information on image to be annotated, prediction score for target item, and the like) from the information processing system 100, and provide the plurality of slices, the representative images, and/or the annotation information received to the user of the user terminal, for example, to an annotator 130. According to an embodiment, the user terminal 110 may provide the representative image for the 3D image including a plurality of slices to the annotator 130 by outputting the same on a display device. Additionally, the user terminal 110 may output additional information associated with the representative image through the display device. To this end, the target item detection model may be trained to further infer additional information on the target item included in a plurality of slices.

Then, the annotator 130 may select at least one pixel associated with the target item from among a plurality of pixels included in the representative image, which are output through the display device of the user terminal 110. In response to the selecting by the annotator 130, the user terminal 110 may provide a slice associated with at least one pixel selected from among a plurality of slices to the annotator 130 by outputting the same through the display device. According to an embodiment, when the annotator 130 makes click inputs for two or more pixels among a plurality of pixels included in a representative image 410 through an input device, the user terminal 110 may provide a slice associated with a pixel corresponding to a median value of the two or more pixels to the annotator 130 by outputting the same through the display device. Additionally, the user terminal 110 may apply a prediction result generated based on the prediction score for the target item on the slice associated with the selected at least one pixel, and output the slice applied with the prediction result.

According to an embodiment, the representative image may be associated with the final prediction score information for the pixels that have the highest prediction score of the plurality of prediction scores for the target item corresponding to the plurality of pixels included in each of the plurality of slices. Additionally, the representative image may be associated with backtracking information on one or more slices associated with the pixels that have the highest prediction score. Accordingly, in response to the selecting by the annotator 130, the user terminal 110 may extract a slice from one or more slices included in the backtracking information, which is associated with selected at least one pixel, and provide the extracted slice to the annotator 130 by outputting it through the display device.

According to an embodiment, the user terminal 110 may output, among a plurality of slices, a slice that has the highest prediction score for the target item in at least one pixel. Alternatively, the user terminal 110 may output one or more slices that have the prediction score for the target item that is equal to or greater than a predetermined threshold in at least one pixel. For example, the output slice having the highest predication score or the output one or more slices may be displayed on the display device associated with the user terminal (110). Alternatively or additionally, when the one or more slices equal to or greater than the predetermined threshold include a plurality of slices equal to or greater than the predetermined threshold, the user terminal 110 may output at least one of the first slice or the last slice in a plurality of slices having the prediction scores equal to or greater than the predetermined threshold.

The annotator 130 may perform an annotation work for the slice, which is output through the display device of the user terminal 110. For example, the annotator 130 may determine an annotation (e.g., a label and the like for the target item) for a partial region of the slice, which is output through the display of the user terminal 110. The annotation (e.g., label) generated through this operation may be provided to the information processing system 100 together with a corresponding slice (or information on a corresponding slice). That is, the information on the generated annotation (e.g., label) and the partial region (e.g., region tagged with the label) of the slice may be provided to the information processing system 100.

The information processing system 100 may be configured to train a machine learning model (e.g., a target item detection model, and the like) using the received annotation and slice. For example, the information processing system 100 may update the target item detection model based on the slice associated with at least one pixel and the received annotation. According to an embodiment, the user terminal 110 and/or the information processing system 100 may apply the annotation for the partial region of the slice, which is output through the display device, to a slice that includes the corresponding target item and is different from the slice, which is output through the display device. In this case, the information processing system 100 may update the target item detection model based on a slice that includes the corresponding target item and is different from the output slice, and the received annotation.

The storage system 120 is a device or a cloud system that stores and manages various types of data associated with the machine learning model for providing annotation information for a 3D image. For efficient data management, the storage system 120 may store and manage various types of data using a database. In an example, the various types of data may include any data associated with the machine learning model, and may include, for example, a 3D image, a plurality of slices, a representative image, label information on target item, which is the result of the annotation work, data related to annotation work, a machine learning model, and so on, but is not limited thereto. While FIG. 1 shows the information processing system 100 and the storage system 120 as separate systems, but is not limited thereto, and they may be incorporated into one system.

Figure 2:
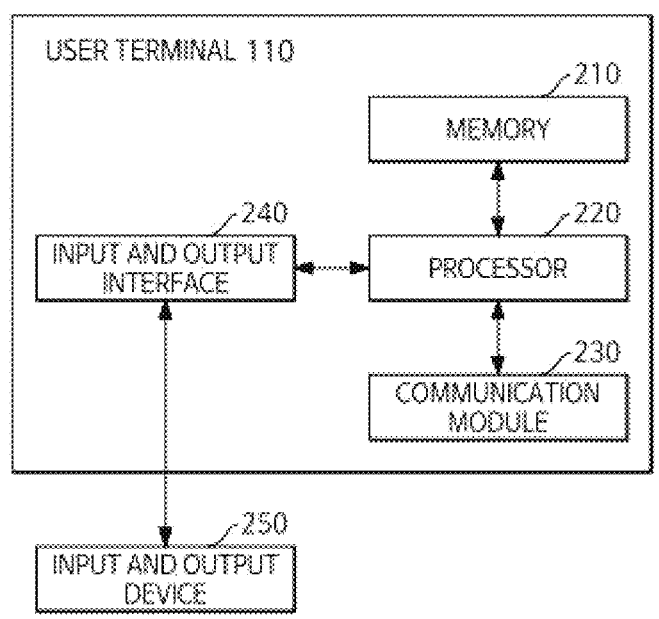
FIG. 2 is a block diagram illustrating an internal configuration of a user terminal according to an embodiment.

FIG. 2 is a block diagram illustrating an internal configuration of the user terminal 110 according to an embodiment. The user terminal 110 may refer to any computing device that is capable of executing an application for providing annotation information and the like and capable of wired/wireless communication, and may include the mobile phone terminal, the tablet terminal, the PC terminal, and the like of FIG. 2, for example. As illustrated, the user terminal 110 may include a memory 210, a processor 220, a communication module 230, and an input and output interface 240. The user terminal 110 may be configured to communicate information and/or data with an information processing system, other systems, devices, and the like using the communication module 230. In addition, an input and output device 250 may be configured to input information and/or data to the user terminal 110 or to output information and/or data generated from the user terminal 110 through the input and output interface 240.

The memory 210 may include any non-transitory computer-readable recording medium. According to an embodiment, the memory 210 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the user terminal 110 as a separate permanent storage device that is separate from the memory. In addition, the memory 210 may store an operating system and at least one program code (e.g., code for applications or the like associated with annotation information providing service).

These software components may be loaded from a computer-readable recording medium separate from the memory 210. Such a separate computer-readable recording medium may include a recording medium directly connectable to the user terminal 110, and may include a computer-readable recording medium such as a floppy drive, a disk, a tape, a DVD/CD-ROM drive, a memory card, and the like, for example. As another example, the software components may be loaded into the memory 210 through the communication module 230 rather than the computer-readable recording medium. For example, at least one program may be loaded into the memory 210 based on a computer program (e.g., applications or the like associated with the annotation information providing service) installed by files provided by developers or a file distribution system that distributes an installation file of the application through a network.

The processor 220 may be configured to process the commands of the computer program by performing basic arithmetic, logic, and input and output operations. The commands may be provided to the processor 220 from the memory 210 or the communication module 230. For example, the processor 220 may be configured to execute the received commands according to a program code stored in a recording device such as the memory 210.

The communication module 230 may provide a configuration or function for the user terminal 110 and the information processing system to communicate with each other through a network, and may provide a configuration or function for the user terminal 110 to communicate with another user terminal or another system (e.g., a separate cloud system or the like). For example, a request or data (e.g., annotation or the like) generated by the processor 220 of the user terminal 110 according to the program code stored in the recording device such as the memory 210 or the like may be transmitted to the information processing system through the network under the control of the communication module 230. Conversely, a control signal or commands provided under the control of the processor of the information processing system may be received by the user terminal 110 through the communication module 230 of the user terminal 110 via the network. For example, the user terminal 110 may receive the 3D image, the representative image, the slice, and the like from the information processing system.

The input and output interface 240 may be a means for interfacing with the input and output device 250. As an example, the input device may include a device such as a camera, a keyboard, a microphone, a mouse, and so on, which includes an audio sensor and/or an image sensor, and the output device may include a device such as a display device, a speaker, a haptic feedback device, and so on. As another example, the input and output interface 240 may be a means for interfacing with a device, such as, for example, a touch screen or the like that integrates a configuration or function for performing inputting and outputting. While FIG. 2 illustrates that the input and output device 250 is not included in the user terminal 110, but are not limited thereto, and the input and output device 320 may be configured as one device with the user terminal 110. In FIG. 2, the input and output interface 240 are illustrated as the components configured separately from the processor 220, but are not limited thereto, and the input and output interface 240 may be configured to be included in the processor 220.

The user terminal 110 may include more components than those illustrated in FIG. 2. However, it would be unnecessary to provide an exact illustration of most of the related components. According to an embodiment, the user terminal 110 may be implemented to include at least a part of the input and output devices 250 described above. In addition, the user terminal 110 may further include another component such as a transceiver, a global positioning system (GPS) module, a camera, various sensors, a database, and the like. For example, when the user terminal 110 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 110.

According to an embodiment, the processor 220 of the user terminal 110 may be configured to operate an application that provides annotation information providing service, or a web browser application. In this case, the program code associated with the corresponding application may be loaded into the memory 210 of the user terminal 110. While the application is running, the processor 220 of the user terminal 110 may receive information and/or data provided from the input and output device 250 through the input and output interface 240 or receive the information and/or data from the information processing system through the communication module 230, and process and store the received information and/or data in the memory 210. In addition, such information and/or data may be provided to the information processing system through the communication module 230.

While the application is running, the processor 220 may receive speech data, text, image, video, and the like input or selected through the input device such as a camera, a microphone, and the like that includes a touch screen, a keyboard, an audio sensor and/or an image sensor connected to the input and output interface 240, and store the received speech data, text, image, and/or video or the like in the memory 210, or provide it to the information processing system through the communication module 230 and the network. According to an embodiment, the processor 220 may receive a user input for selecting at least one pixel associated with a target item from among a plurality of pixels included in the representative image. In another embodiment, the processor 220 may receive an annotation for a partial region of a slice input through the input device, and provide the corresponding data/request to the information processing system through the network and communication module 230.

The processor 220 of the user terminal 110 may transmit and output the information and/or data to the input/output device 250 through the input and output interface 240. For example, the processor 220 of the user terminal 110 may output the processed information and/or data through the output device 320 such as a device capable of outputting a display (e.g., a touch screen, a display device, and the like), a device capable of outputting a voice (e.g., speaker), and the like. According to an embodiment, a representative image for a 3D image, including a plurality of slices, may be output. Additionally, the processor 220 may output, among the plurality of slices, a slice that is associated with at least one pixel.

Figure 3:
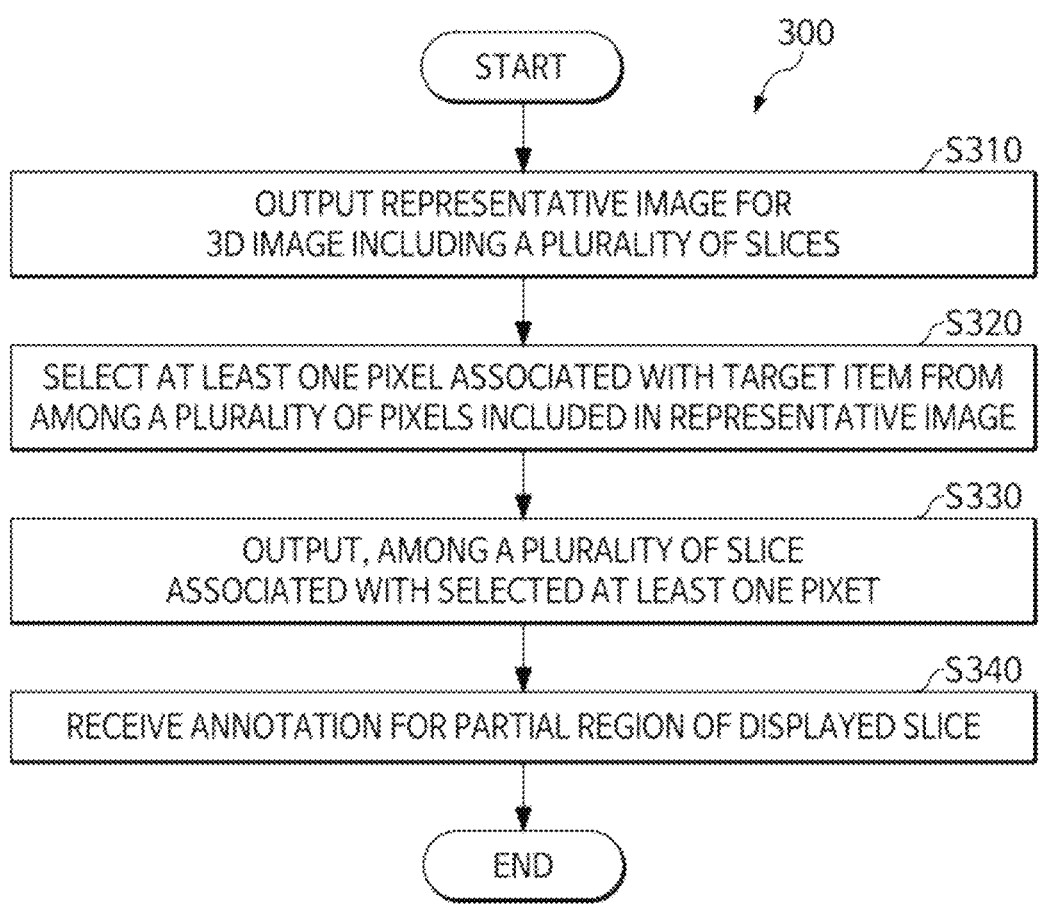
FIG. 3 is a flowchart illustrating a method for providing annotation information for a 3D image according to an embodiment.

FIG. 3 is a flowchart illustrating a method 300 for providing annotation information for a 3D image according to an embodiment. According to an embodiment, the method 300 of providing annotation information for a 3D image may be performed by a processor (e.g., one or more processors of the user terminal). The method 300 for providing annotation information for a 3D image may be initiated by outputting the representative image for the 3D image including a plurality of slices by the processor, at S310. In an example, the representative image may be generated based on the prediction score for the target item. Alternatively, the representative image may be one of a plurality of slices. Additionally, the representative image may be associated with the final prediction score information for the pixels that have the highest prediction score of the prediction scores for the target item corresponding to the plurality of pixels included in each of the plurality of slices, and with the backtracking information on one or more slices associated with the pixels that have the highest prediction score. According to an embodiment, the processor may output additional information associated with the representative image. For example, the additional information may include calcification, soft tissue lesion, BI-RADS, density, and the like, of cancer lesion. To this end, the target item detection model may be trained to further infer the additional information on the target item included in the 3D image.

The processor may select at least one pixel associated with the target item from among a plurality of pixels included in the representative image, at S320. In response, the processor may output, among the plurality of slices, a slice, which is associated with the selected at least one pixel, at S330. For example, the processor may extract a slice from one or more slices included in the backtracking information associated with at least one pixel selected, and output the extracted slice. According to an embodiment, the processor may apply a prediction result generated based on the prediction score for the target item to the slice associated with selected at least one pixel, and output the slice applied with the prediction result. That is, the prediction result may be output together with the slice, thereby assisting the annotator's annotation work.

According to an embodiment, the processor may output, among a plurality of slices, a slice for the target item that has the highest prediction score in at least one pixel. That is, among the plurality of slices, the slice where the target item is most visible may be provided to the annotator as an image to be annotated. Alternatively, the processor may output one or more slices (that is, the slices that are determined to be where the target item is visible) that have the prediction score for the target item in at least one pixel equal to or greater than a predetermined threshold. Alternatively or additionally, the processor may output at least one of the first slice or the last slice in the plurality of slices having the prediction scores equal to or greater than the predetermined threshold.

The processor may receive an annotation for a partial region of the output slice, at S340. The target item detection model may be updated based on the received annotation and the slice associated with at least one pixel. According to an embodiment, the processor may apply the received annotation for the partial region to a slice that includes the target item and is different from the output slice associated with at least one pixel. In this case, the target item detection model may be updated based on the slice that is different from the slice associated with at least one pixel, and the received annotation.

Figure 4:
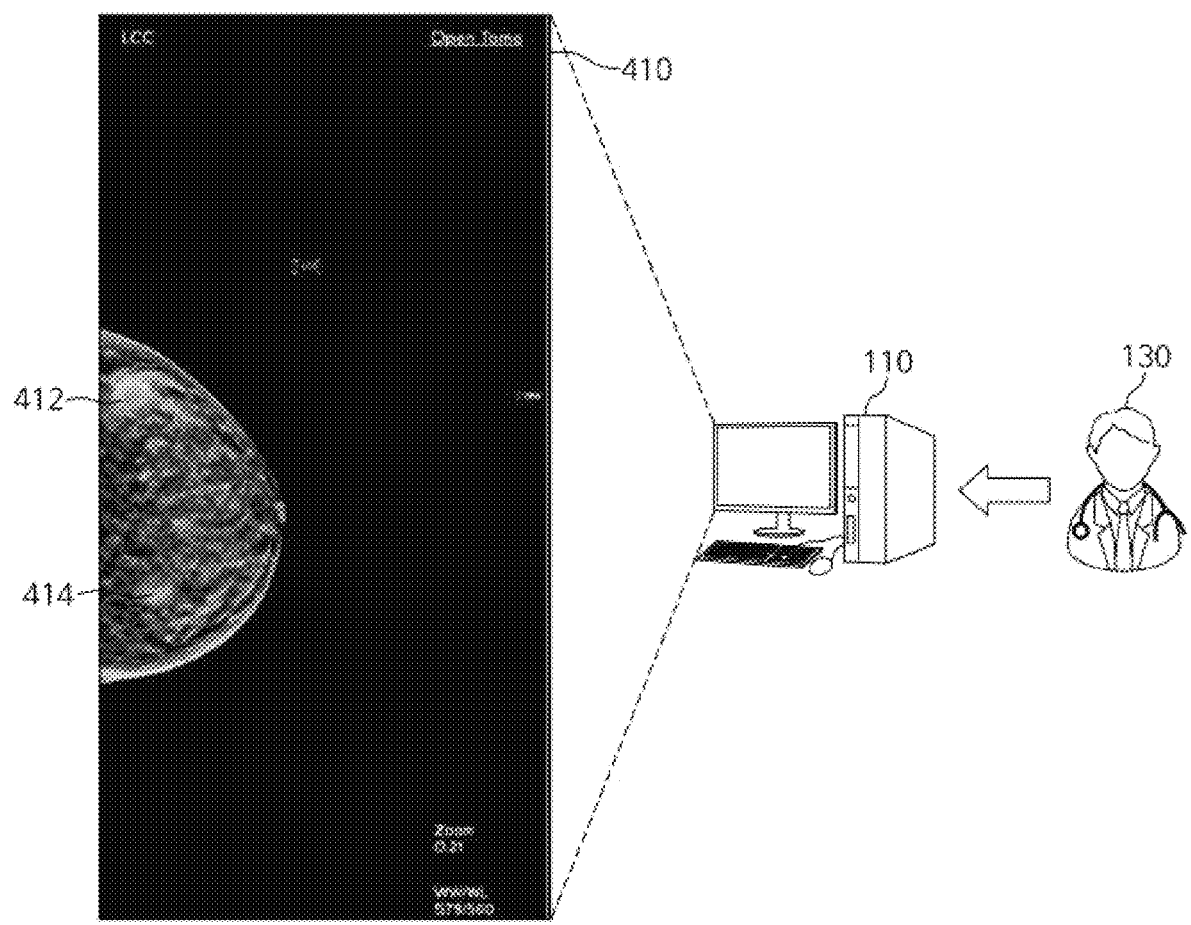
FIG. 4 is a diagram illustrating an example in which a user is provided with a representative image through a user terminal according to an embodiment.

FIG. 4 is a diagram illustrating an example in which the user 130 is provided with a representative image 410 through the user terminal 110 according to an embodiment. According to an embodiment, the user terminal 110 may provide the user of the user terminal 110, for example, the annotator 130 with the representative image 410 for the 3D image (e.g., Digital Breast Tomosynthesis image, and the like) including a plurality of slices by outputting the same through the display device. For example, the representative image 410 may be displayed on the display device associated with the user terminal 110. In this case, the plurality of slices may correspond to 2D images forming the 3D image, and the representative image 410 may correspond to a 2D image representing the 3D image (or a plurality of slices). For example, the representative image 410 may be a resultant image of synthesizing a plurality of slices to make the lesion clearly visible. Alternatively, the representative image 410 may be one of a plurality of slices included in the 3D image. Alternatively, the representative image 410 may be a representative image provided by a 3D image capturing system and/or an image output system.

The user terminal 110 may output the representative image 410 together with prediction results 412 and 414 for the target item (e.g., cancer lesion and the like). For example, the user terminal 110 may apply the cancer lesion prediction results 412 and 414 expressed in the form of a heatmap, contour, or the like to the representative image 410 for output through the display device. As illustrated, the user terminal 110 may provide the annotator 130 with the representative image 410 in which the prediction results 412 and 414 of the cancer lesion are expressed in the form of a heatmap by outputting the same.

The annotator 130 may select at least one pixel associated with the target item from among a plurality of pixels included in the provided representative image 410. For example, in order to perform an annotation work for one 412 of the cancer lesion prediction results 412 and 414, which are output together with the representative image 410, the annotator 130 may select at least one pixel corresponding to the prediction result 412.

In FIG. 4, the prediction results 412 and 414 for the target item are output together with the representative image 410, but the embodiment is not limited thereto. For example, the additional information associated with the representative image 410 (e.g., calcification, soft tissue lesion, BI-RADS, density, and the like, of cancer lesion) may also be output. To this end, the target item detection model may be trained to further infer the additional information on the target item included in a plurality of slices.

Figure 5:
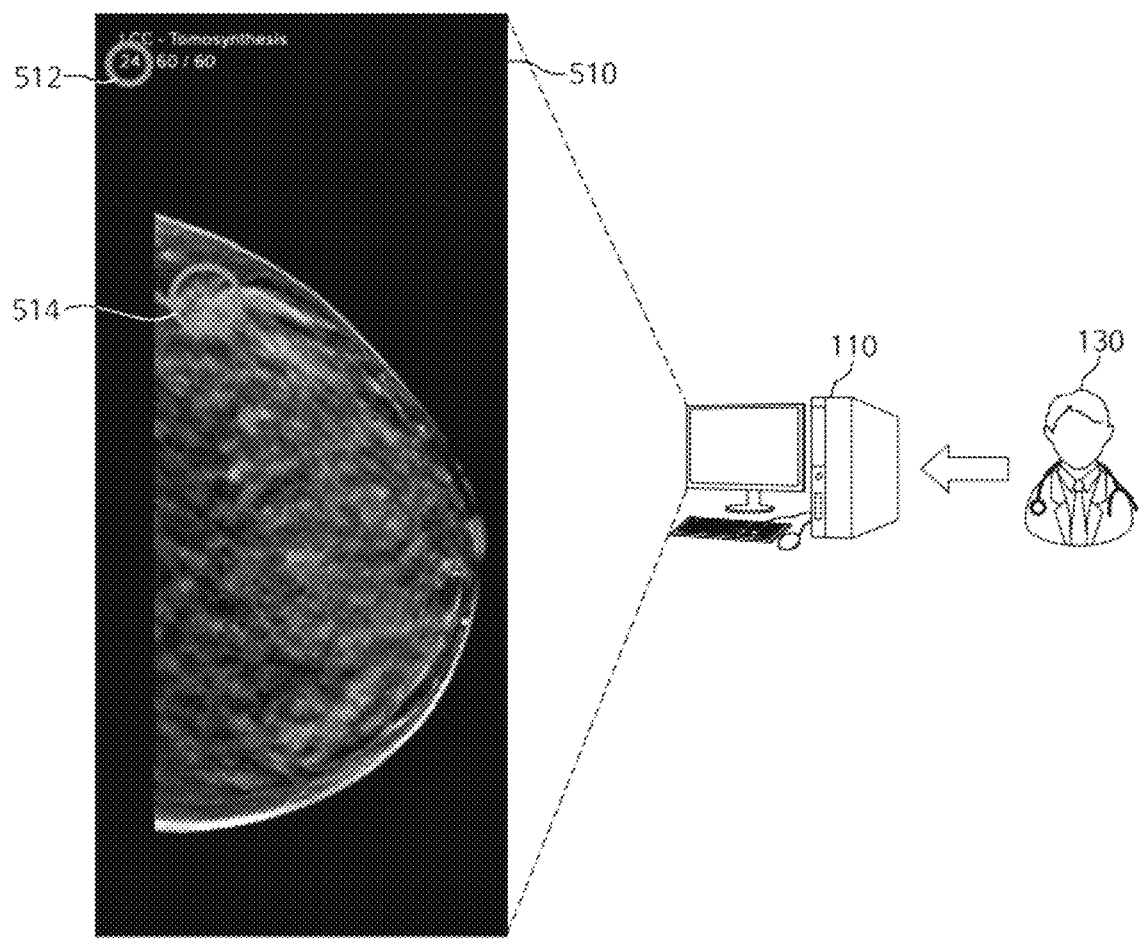
FIG. 5 is a diagram illustrating an example in which the user is provided with a slice associated with at least one pixel selected by the user through a user terminal according to an embodiment.

FIG. 5 is a diagram illustrating an example in which the user 130 is provided with a slice 510 associated with at least one pixel selected through the user terminal 110 according to an embodiment. The user terminal 110 may provide, as an image to be annotated, at least one slice 510 of a plurality of slices to the user of the user terminal 110, for example, to the annotator 130. According to an embodiment, the user terminal 110 may output the slice 510 of a plurality of slices, which is associated with the at least one pixel selected. As shown, the slice 510 associated with the selected at least one pixel may be displayed on the displayed device associated with the user terminal. For example, the user terminal 110 may output, among a plurality of slices, a slice that has the highest prediction score for the target item in at least one pixel. That is, when the annotator 130 makes a click or touch input with respect to at least one of a plurality of pixels included in the representative image through the input device, the slice where the cancer lesion associated with the corresponding pixel is most visible may be provided, thereby saving time of the annotator 130 at annotation work.

According to an embodiment, the user terminal 110 may provide, as an image to be annotated, one or more slices that have a prediction score for the target item in at least one pixel equal to or greater than a predetermined threshold (e.g., 0.9). For example, when the prediction score for the target item in the 24th to 33rd slices of the 60 slices is equal to or greater than the predetermined threshold, the user terminal 110 may provide the 24th to 33rd slices as an image to be annotated to the annotator 130. In an example, the user terminal 110 may output one slice included in the plurality of slices. Then, when receiving a user input (e.g., "next button") for outputting or displaying another slice in the plurality of slices by the annotator, the user terminal 110 may output or display another slice among the provided plurality of slices. This process may be performed until all of the provided slices are output or displayed through the user terminal 110. Alternatively, the user terminal 110 may output or display two or more slices of a plurality of provided slices through the display device at once, or may sequentially output or display a plurality of slices through the display device without a user input.

In another embodiment, the user terminal 110 may provide, as an image to be annotated, at least one of the first slice or the last slice in a plurality of slices having the prediction scores equal to or greater than the predetermined threshold. That is, when the slice having the prediction score for the target item equal to or greater than the predetermined threshold includes a plurality of consecutive slices, the user terminal 110 may provide two slices at both ends of the plurality of consecutive slices as an image to be annotated. For example, when the prediction score for the target item in the 24th to 33rd slices of the 60 slices is equal to or greater than the predetermined threshold, the user terminal 110 may provide the 24th and 33rd slices as an image to be annotated to the annotator 130. In this case, the 24th slice and the 33rd slice may be displayed on one screen or may be sequentially displayed.

As illustrated, when the annotator selects one cancer lesion prediction result (i.e., the region predicted to have a cancer lesion) from the representative image, the user terminal 110 may provide the slice 510 determined to be where the corresponding cancer lesion is most visible (e.g., the slice having the highest prediction score for the corresponding cancer lesion). In this case, the plurality of slices may include information on the sequence of the plurality of slices, and accordingly, information 512 on the sequence of the slice 510 may be output together with the slice 510. As illustrated, the user terminal 110 may indicate that the output slice 510 corresponds to the 24th slice of the 60 slices.

The annotator 130 may perform an annotation work for the provided image to be annotated. According to an embodiment, the annotator 130 may determine an annotation for a partial region 514 of the output slice 510. For example, the annotator 130 may tag a label to the region 514 associated with the target item of the slice using the input device, etc. The user terminal 110 may receive the annotation determined by the annotator 130 through the input device or the like. In addition, the user terminal 110 may transmit the received annotation to the information processing system.

The user terminal 110 and/or the information processing system may update the target item detection model based on the received annotation and the slice 510 for which the annotation work has been performed. According to an embodiment, the user terminal 110 and/or the information processing system may expand the application of the received annotation to a slice that includes the target item and is different from the output slice 510. For example, the user terminal 110 and/or the information processing system may apply the annotation, which is received for a cancer lesion appearing in the partial region 514 of the 24th slice 510, to the associated region in the 25th to 33rd slices that include the cancer lesion. In this case, the user terminal 110 and/or the information processing system may update the target item detection model based on the slices (that is, 25th to 33rd slices) that include the target item and is different from the output slice 510 and the received annotation.

In FIG. 5, one slice is output through the display device, but the embodiment is not limited thereto. For example, different numbers of slices may be output through the display device. In this case, the annotator 130 may perform an annotation work for each of the output slices. In addition, while FIG. 5 shows the annotator 130 performs the annotation work for one cancer lesion included in one slice, but is not limited thereto. For example, the annotation works for different numbers of cancer lesions may be performed for one slice.

Additionally, the user terminal 110 and/or the information processing system may apply the prediction result (e.g., cancer lesion prediction result expressed by a heatmap, and the like) generated based on the prediction score for the target item to a slice associated with at least one pixel. Accordingly, the user terminal 110 may assist the annotator 130 with the annotation work by outputting the slice applied with the prediction result.

Figure 6:
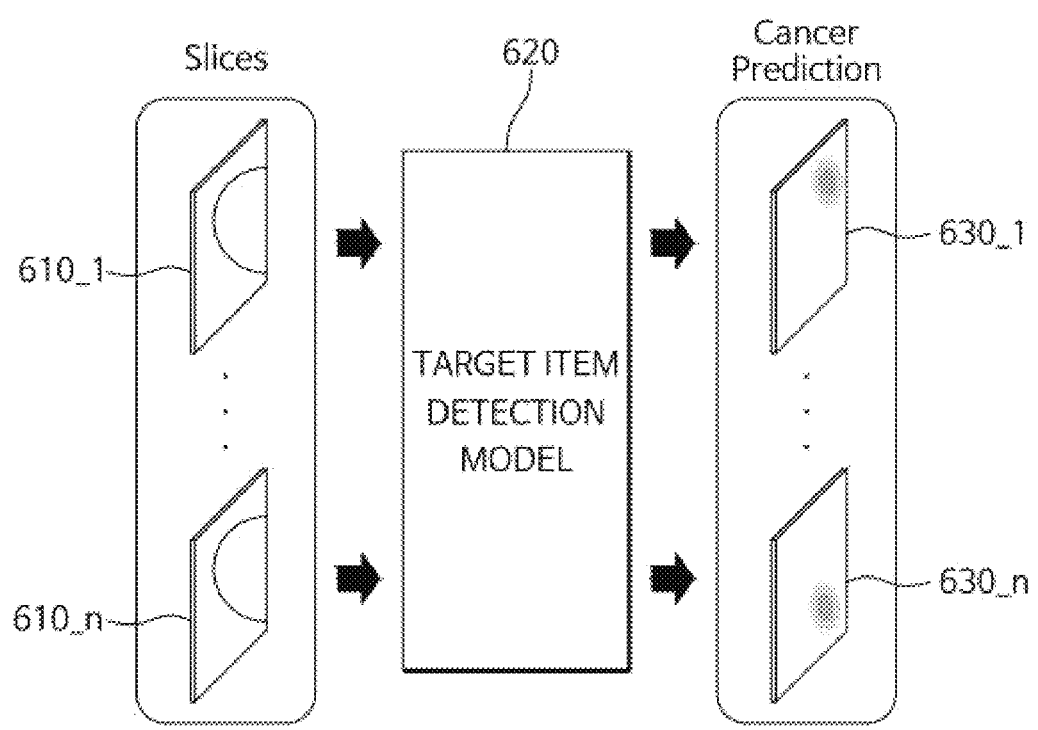
FIG. 6 is a diagram illustrating an example of generating a prediction result by inputting a plurality of slices into a target item detection model according to an embodiment.

FIG. 6 is a diagram illustrating an example of generating a prediction result 630_1, . . . , 630_n by inputting a plurality of slices 610_1, . . . , 610_n to a target item detection model 620 according to an embodiment. According to an embodiment, the information processing system and/or the user terminal may input each of the plurality of slices 610_1, . . . , 610_n into the target item detection model 620 (e.g., cancer detection deep learning network), and output the prediction results 630_1, . . . , 630_n for the target item in each of the plurality of slices. To this end, the target item detection model may be trained to output a prediction score for the target item associated with a plurality of pixels included in the image. For example, the target item detection model may be trained to calculate a prediction score for the presence or absence of a cancer lesion for each of a plurality of pixels included in the image. In an example, the plurality of slices 610_1, . . . , 610_n may refer to at least some of the slices forming the 3D image.

According to an embodiment, as each of the plurality of slices 610_1, . . . , 610_n is input to the target item detection model 620, the information processing system and/or the user terminal may generate the prediction result 630_1, . . . , 630_n for the target item based on the output prediction score for the target item. In an example, the prediction score for the target item may include a plurality of prediction scores for a plurality of pixels included in each of the plurality of slices. In addition, the prediction result 630_1, . . . , 630_n for the target item may include prediction result for the presence or absence of cancer lesions in each slice, probability of presence, a location, etc.

As shown, if the first slice 610_1 is input to the target item detection model 620, the first prediction result 630_1 predicting the presence of a first cancer lesion in an upper right region of the first slice may be output. In addition, if the second slice 610_n (n is a natural number and greater than 1) is input to the target item detection model 620, the second prediction result 630_n (n is a natural number and greater than 1) predicting the presence of a second cancer lesion in a lower right region of the second image may be output. As illustrated, these prediction results (630_1, . . . , 630_n) may be expressed in the form of a heatmap or the like according to the prediction scores for cancer lesions in a plurality of pixels included in each of the plurality of slices (610_1, . . . , 610_n).

Figure 7:
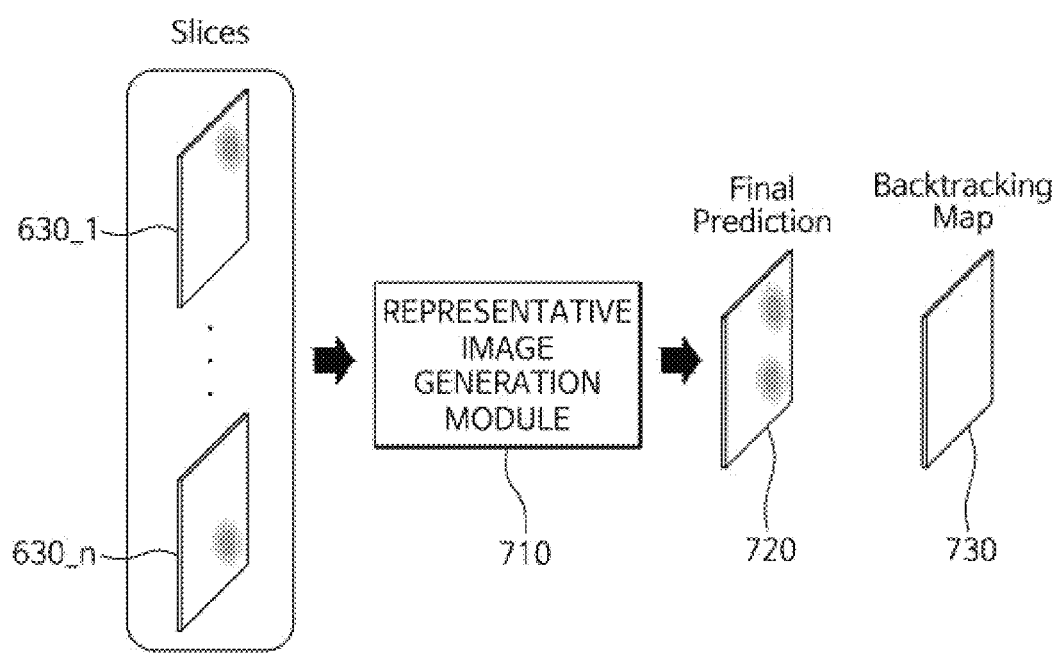
FIG. 7 is a diagram illustrating an example of generating a representative image based on a prediction result for a target item in each of a plurality of slices according to an embodiment.

FIG. 7 is a diagram illustrating an example of generating a representative image including a final prediction result 720 and backtracking information 730 based on the prediction results 630_1, . . . , 630_n for the target item in each of the plurality of slices according to an embodiment. A representative image generation module 710 may generate a representative image based on the prediction results 630_1, . . . , 630_n for the target item in each of the plurality of slices. In an example, the representative image may show an image in which a plurality of slices are synthesized such that the existing lesions are clearly visible in the 3D image. In addition, the representative image generation module 710 may be included in the information processing system and/or the user terminal. In contrast, when a representative image is generated by a system that generates a 3D image, a representative image generation module 710 may be included in an imaging system that generated the 3D image.

According to an embodiment, the representative image may be associated with or include the final prediction score information for the pixels that have the highest prediction score of the plurality of prediction scores for the target item corresponding to the plurality of pixels included in each of the plurality of slices, and the backtracking information 730 on one or more slices associated with the pixels that have the highest prediction score. In this case, the final prediction score information may be included in the final prediction result 720.

According to an embodiment, the representative image generation module 710 may generate the final prediction result 720 including the final prediction score information. As illustrated, the representative image generation module 710 may merge a first prediction result 630_1 for a first lesion corresponding to a first slice and a second prediction result 630_n for a second lesion corresponding to a second slice to generate the final prediction result 720. The resultant final prediction result 720 may be expressed as a heatmap or the like, and may be included in or associated with the representative image.

Additionally, the representative image generation module 710 may generate the backtracking information 730 of the representative image based on the prediction result and/or the final prediction result 720 for each of the plurality of slices. The backtracking information 730 may include slice information (e.g., index information) corresponding to each of a plurality of pixels included in the representative image. That is, it may include the information on slice to provide to the annotator when the annotator selects a partial region of the representative image. For example, the backtracking information 730 may be stored such that, when the annotator selects a region associated with the first lesion in the representative image, it provides a slice where the corresponding first lesion is most visible (e.g., the slice having the highest prediction score for the first lesion, one or more slices for which the prediction score for the first lesion is equal to or greater than a predetermined threshold, and the like).

According to an embodiment, the user terminal may output, among one or more slices included in the backtracking information 730, a slice which is associated with at least one pixel selected. For example, in response to an input for selecting a partial region of the representative image received from the annotator, the user terminal may output, as an image to be annotated, at least one of the plurality of slices based on the backtracking information of the partial region.

Figure 8:
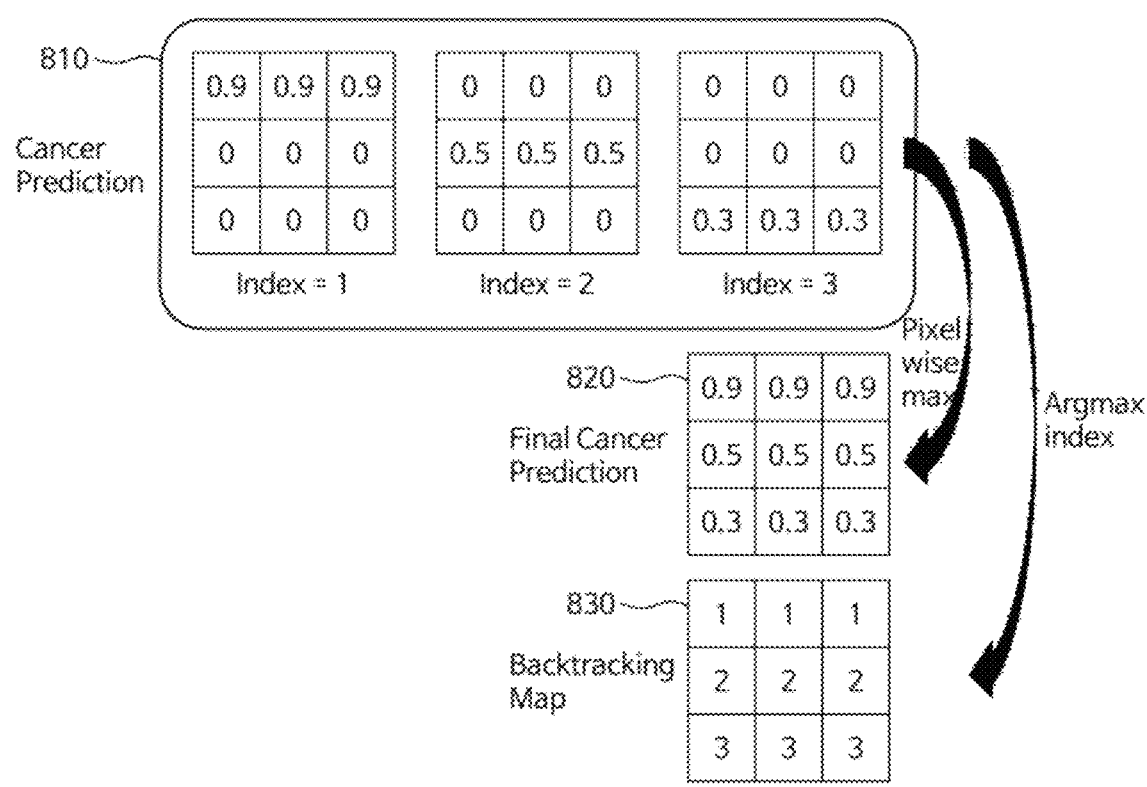
FIG. 8 is a diagram illustrating an example of a process of generating a representative image associated with a final prediction result and backtracking information based on a prediction result for a target item in each of a plurality of slices according to an embodiment.

FIG. 8 is a diagram illustrating an example of a process of generating a representative image associated with a final prediction result 820 and backtracking information 830 based on a prediction result 810 for a target item in each of a plurality of slices according to an embodiment. Each of the plurality of slices may correspond to one index. For example, the first slice may correspond to index "1," the second slice may correspond to index "2," and the third slice may correspond to index "3." As illustrated, when the 3D image is formed of three slices and each slice includes 9 pixels, the information processing system and/or the user terminal may input each of the three slices to the target item detection model, and output the prediction result 810 for the target item in each of the three slices. For example, the information processing system and/or the user terminal may output the prediction score for each of nine pixels included in the slice.

Thereafter, the information processing system and/or the user terminal may generate the final prediction score information by performing pixel-wise max on the prediction result in each of a plurality of slices. That is, from the prediction result 810 for each of the three slices, the highest score values for each of the pixels may be extracted and fused to generate the final prediction score information.

For example, as illustrated, 0.9, which is the highest prediction score among the prediction scores for each of the pixels in row 1, may be determined to be the final prediction score for each of the pixels in row 1, 0.5, which is the highest prediction score among the prediction scores for each of the pixels in row 2, may be determined to be the final prediction score for each of the pixels in row 2, and 0.3, which is the highest prediction score among the prediction scores for each of the pixels in row 3, may be determined to be the final prediction score for each of the pixels in row 3. Accordingly, the final prediction result 820 including the final prediction score determined in this way may be generated. In the present disclosure, the highest prediction score is determined out of the prediction scores for each of corresponding pixels in each of three slices, but is not limited thereto, and the highest score may be determined based on the prediction score for any combination of a plurality of pixels. For example, an average value or a median value of the prediction scores corresponding to the three pixels may be used as a representative prediction score of the three pixels.

Additionally, the information processing system and/or the user terminal may generate, for each pixel, the backtracking information 830 including the index of the slice whose prediction score value is determined to be the final prediction score. For example, as illustrated, each of the pixels in row 1 may correspond to index "1" of the first slice whose prediction score value is determined to be the final prediction score for each of the pixels in row 1. In addition, each of the pixels in row 2 may correspond to index "2" of the second slice whose prediction score value is determined to be the final prediction score for each of the pixels in row 2. Further, each of the pixels in row 3 may correspond to index "3" of the third slice whose prediction score value is determined to be the final prediction score for each of the pixels in row 3.

The final prediction result 820 and the backtracking information 830 generated in this way may be included in or associated with the representative image. According to an embodiment, when the annotator selects at least one pixel associated with the target item from among a plurality of pixels included in the representative image, the user terminal may output a slice that is retrieved based on the final prediction result 820 and the backtracking information 830. For example, when the annotator selects a pixel corresponding to row 1 from among the 9 pixels included in the representative image, the user terminal may output the first slice that corresponds to index "1" based on the backtracking information.

Figure 9:
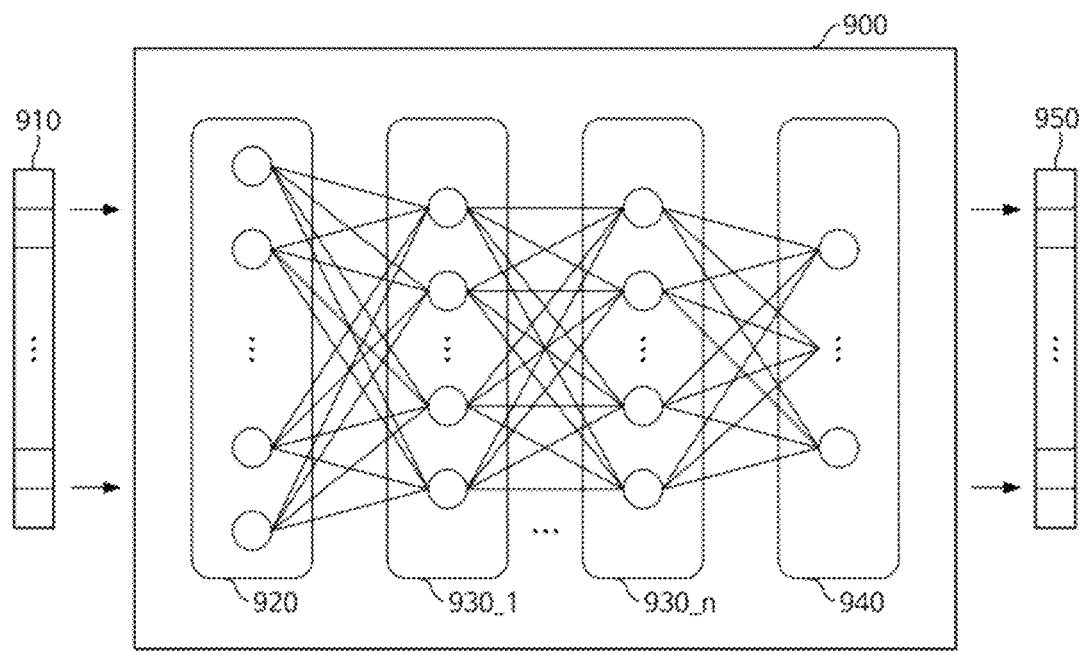
FIG. 9 is an exemplary diagram illustrating an artificial neural network model according to an exemplary embodiment.

FIG. 9 is an exemplary diagram illustrating an artificial neural network model 900 according to an embodiment. In machine learning technology and cognitive science, an artificial neural network model 900 as an example of the machine learning model refers to a statistical learning algorithm implemented based on a structure of a biological neural network, or to a structure that executes such algorithm.

According to an embodiment, the artificial neural network model 900 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 900 may include any probability model, neural network model, and the like, that is used in artificial intelligence learning methods such as machine learning and deep learning.

According to an embodiment, the artificial neural network model 900 may include an artificial neural network model configured to input an image and output a prediction score for a target item for each of a plurality of pixels included in the image. Additionally, the artificial neural network model 900 may include an artificial neural network model configured to be inputted with a 3D image or a plurality of 2D images forming the 3D image to further infer the additional information (e.g., calcification, soft tissue lesion, BI-RADS, density, and the like, of breast cancer lesion) about the target item included in the 3D image.

The artificial neural network model 900 is implemented as a multilayer perceptron (MLP) formed of multiple nodes and connections between them. The artificial neural network model 900 according to an embodiment may be implemented using one of various artificial neural network model structures including the MLP. As shown in FIG. 9, the artificial neural network model 900 includes an input layer 920 receiving an input signal or data 910 from the outside, an output layer 940 outputting an output signal or data 950 corresponding to the input data, and (n) number of hidden layers 930_1 to 930_n (where n is a positive integer) positioned between the input layer 920 and the output layer 940 to receive a signal from the input layer 920, extract the features, and transmit the features to the output layer 940. In an example, the output layer 940 receives signals from the hidden layers 930_1 to 930_n and outputs them to the outside.

The method of training the artificial neural network model 900 includes the supervised learning that trains to optimize for solving a problem with inputs of teacher signals (correct answer), and the unsupervised learning that does not require a teacher signal. The information processing system may train the artificial neural network model 900 with the supervise learning and/or the unsupervised learning to output the prediction score for the target item for each of a plurality of pixels included in a plurality of slices.

The artificial neural network model 900 trained in this way may be stored in a memory (not illustrated) of the information processing system, and in response to an input of a 3D image and/or a plurality of slices received from the communication module and/or the memory, the artificial neural network model 900 may output the prediction score for the target item for each of a plurality of pixels included in a plurality of slices.

According to an embodiment, an input variable of a machine learning model capable of detecting a target item, that is, the input variable of the artificial neural network model 900 may be a 3D image (e.g., a Digital Breast Tomosynthesis image, and the like) and/or a plurality of slices. For example, the input variable input to the input layer 920 of the artificial neural network model 900 may be the image vector 910 in which the 3D image and/or a plurality of slices are configured as one vector data element. In response to the input of the image, the output variable output from the output layer 940 of the artificial neural network model 900 may be a vector 950 representing or characterizing the prediction score for the target item (e.g., the cancer lesion) for each of a plurality of pixels included in at least a portion of the plurality of slices. Additionally, the output layer 940 of the artificial neural network model 900 may be configured to output a vector that represents the additional information such as calcification, soft tissue lesion, BI-RADS, density, and the like, of breast cancer lesion. In addition, the output layer 740 of the artificial neural network model 700 may be configured to output a vector representing the reliability and/or accuracy of the output prediction score and the additional information. In the present disclosure, the output variable of the artificial neural network model 900 is not limited to the type described above, and may include any information/data representing the prediction result for the target item.

As described above, the input layer 920 and the output layer 940 of the artificial neural network model 900 are respectively matched with a plurality of output variables corresponding to a plurality of input variables, and the synaptic values between nodes included in the input layer 920, the hidden layers 930_1 to 930_n, and the output layer 940 are adjusted, so that by training, a correct output corresponding to a specific input can be extracted. Through this training process, the features hidden in the input variables of the artificial neural network model 900 may be confirmed, and the synaptic values (or weights) between the nodes of the artificial neural network model 900 may be adjusted so as to reduce the errors between the output variable calculated based on the input variable and the target output. Using the artificial neural network model 900 trained in this way, in response to a 3D image and/or a plurality of slices inputted, the prediction results for the target item may be output to a plurality of pixels included in the input image.

Figure 10:
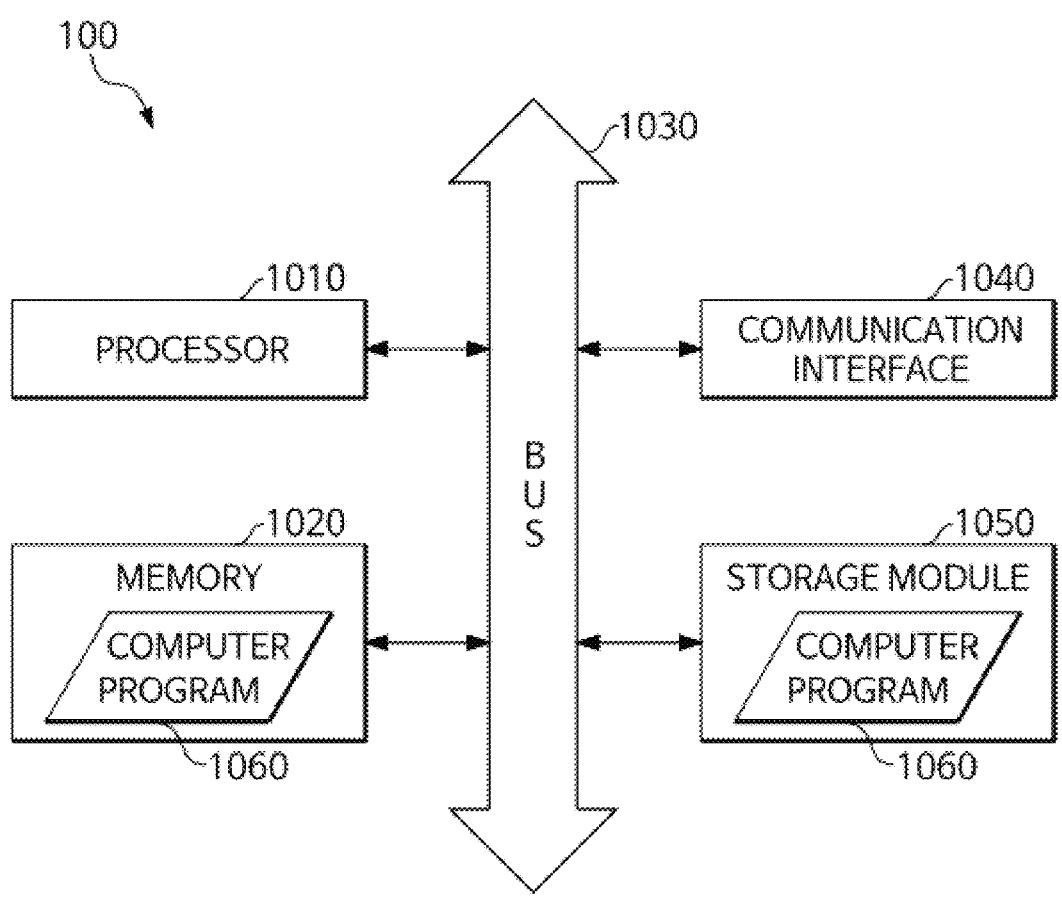
FIG. 10 is a block diagram of an information processing system according to an embodiment.

FIG. 10 is a block diagram of an information processing system according to an embodiment. As shown, the information processing system 100 may include one or more processors 1010, a bus 1030, a communication interface 1040, a memory 1020 that loads a computer program 1060 executable by the processor 1010, and a storage module 1050 that stores the computer program 1060. However, FIG. 10 shows only certain components related to the embodiment of the present disclosure. Accordingly, those of ordinary skill in the art to which the present disclosure pertains will be able to recognize that other general-purpose components may be further included in addition to the components shown in FIG. 10.

The processor 1010 controls the overall operation of components of the information processing system 100. The processor 1010 may be configured to include a central processing unit (CPU), a micro processor unit (MPU), a micro controller unit (MCU), a graphic processing unit (GPU), or any type of processor well known in the technical field of the present disclosure. In addition, the processor 1010 may perform an arithmetic operation on at least one application or program for executing the method according to the embodiments of the present disclosure. The information processing system 100 may include one or more processors.

The memory 1020 may store various types of data, commands, and/or information. The memory 1020 may load one or more computer programs 1060 from the storage module 1050 in order to execute a method/operation according to various embodiments of the present disclosure. The memory 1020 may be implemented as a volatile memory such as RAM, but the technical scope of the present disclosure is not limited thereto.

The bus 1030 may provide a communication function between components of the information processing system 100. The bus 1030 may be implemented as various types of buses such as an address bus, a data bus, a control bus, or the like.

The communication interface 1040 may support wired/wireless Internet communication of the information processing system 100. In addition, the communication interface 1040 may support various communication methods other than Internet communication. To this end, the communication interface 1040 may be configured to include a communication module well known in the technical field of the present disclosure.

The storage module 1050 may non-temporarily store one or more computer programs 1060. The storage module 1050 may be configured to include a nonvolatile memory such as a read only memory (ROM), an erasable programmable ROM (EPROM), an electrically erasable programmable ROM (EEPROM), a flash memory, and the like, a hard disk, a detachable disk, or any type of computer-readable recording medium well known in the art to which the present disclosure pertains.

The computer program 1060 may include one or more instructions that, when loaded into the memory 1020, cause the processor 1010 to perform an operation/method in accordance with various embodiments of the present disclosure. That is, the processor 1010 may perform operations/methods according to various embodiments of the present disclosure by executing one or more instructions.

For example, the computer program 1060 may include one or more instructions for causing operations of training the target item detection model to output the prediction score for the target item for each of a plurality of pixels included in the 2D image, training the target item detection model to further infer the additional information on the target item included in the 3D image, inputting each of a plurality of slices to the target item detection model to output the prediction score for the target item, updating the target item detection model based on a slice associated with at least one pixel and a received annotation, updating the target item detection model based on a slice different from the slice associated with the at least one pixel and the received annotation, and the like. In this case, a system for providing annotation information for a 3D image according to some embodiments of the present disclosure may be implemented through the information processing system 100.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with some embodiments herein, it should be understood that various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method, performed by one or more computing devices, for providing analysis results for an artificial neural network model for a 3D image, the method comprising:
   outputting a representative image for the 3D image including a plurality of slices;
   selecting at least one pixel associated with a target item from among a plurality of pixels included in the representative image; and
   outputting, among the plurality of slices, at least one slice associated with the selected at least one pixel based on a prediction score for the target item,
   wherein the prediction score for the target item is output by inputting each of the plurality of slices to a target item detection model, and
   wherein the outputting, among the plurality of slices, the at least one slice associated with the selected at least one pixel includes outputting, based on the prediction score, a slice where a visibility of the target item is highest among the plurality of slices.

2. The method according to claim 1, wherein:
   the prediction score for the target item includes a plurality of prediction scores for a plurality of pixels included in each of the plurality of slices; and
   the target item detection model is trained to output the prediction score for the target item for each of the plurality of pixels included in a 2D image.

3. The method according to claim 1, wherein the outputting, among the plurality of slices, the at least one slice associated with the selected at least one pixel includes outputting, among the plurality of slices, a slice that has a highest prediction score for the target item in the at least one pixel.

4. The method according to claim 1, wherein the outputting, among the plurality of slices, the at least one slice associated with the selected at least one pixel comprises:
   outputting one or more slices that have prediction scores for the target item in the at selected least one pixel equal to or greater than a predetermined threshold.

5. The method according to claim 4, wherein:
   the plurality of slices include information on a sequence of the plurality of slices;
   the one or more slices that have the prediction scores equal to or greater than the predetermined threshold include a plurality of slices that have prediction scores equal to or greater than the predetermined threshold; and
   the outputting, among the plurality of slices, the at least one slice associated with the selected at least one pixel includes outputting at least one of a first slice or a last slice in the plurality of slices that have the prediction scores equal to or greater than the predetermined threshold.

6. The method according to claim 1, wherein the outputting the at least one slice associated with the selected at least one pixel includes:
   applying a prediction result generated based on the prediction score for the target item to the at least one slice associated with the at least one pixel; and
   outputting the applied slice.

7. The method according to claim 1, wherein:
   the target item detection model is trained to further infer additional information on the target item included in the 3D image; and the outputting the representative image for the 3D image including the plurality of slices includes outputting additional information including at least one of a calcification, a soft tissue lesion, a BI-RADS or a density of the target item, associated with the representative image.

8. A computer program stored in a computer-readable recording medium, for executing the method according to claim 1 on a computer.

9. A user terminal, comprising:
a memory storing one or more instructions; and
a processor configured to execute the stored one or more instructions to:
output a representative image for a 3D image including a plurality of slices;
select at least one pixel associated with a target item from among a plurality of pixels included in the representative image; and
output, among the plurality of slices, at least one slice associated with the selected at least one pixel based on a prediction score for the target item;
wherein the prediction score for the target item is output by inputting each of the plurality of slices to a target item detection model, and
wherein the processor is further configured to output, based on the prediction score, a slice where a visibility of the target item is highest among the plurality of slices.

10. The user terminal according to claim 9, wherein:
the prediction score for the target item includes a plurality of prediction scores for a plurality of pixels included in each of the plurality of slices; and
the target item detection model is trained to output the prediction score for the target item for each of the plurality of pixels included in a 2D image.

11. The user terminal according to claim 9, wherein the processor is further configured to output, among the plurality of slices, a slice that has a highest prediction score for the target item in the at least one pixel.

12. The user terminal according to claim 9, further configured to output one or more slices that have prediction scores for the target item in the selected at least one pixel equal to or greater than a predetermined threshold.

13. The method according to claim 10, wherein the outputting the representative image includes outputting the representative image with the prediction result, the prediction result being applied in a form of at least one of a heatmap or contour to the representative image.

14. The method according to claim 1, wherein the representative image is one of an image generated by compositing multiple slices among the plurality of slices to come out the target item, one of the plurality of slices included in the 3D image, or an image provided by a 3D image capturing system.

15. The user terminal according to claim 9, wherein the processor is further configured to:
apply a prediction result generated based on the prediction score for the target item to the at least one slice associated with the at least one pixel; and
output the applied at least one slice.

16. The user terminal according to claim 15, wherein the processor is further configured to output the representative image with the prediction result, the prediction result being applied in a form of at least one of a heatmap or contour to the representative image.

17. The user terminal according to claim 9, wherein:
the target item detection model is trained to further infer additional information on the target item included in the 3D image; and
the processor is further configured to output additional information including at least one of a calcification, a soft tissue lesion, a BI-RADS or a density of the target item, associated with the representative image.

18. The user terminal according to claim 9, wherein the representative image is one of an image generated by compositing multiple slices among the plurality of slices to come out the target item, one of the plurality of slices included in the 3D image, or an image provided by a 3D image capturing system.

* * * * *